United States Patent
Sun

(10) Patent No.: US 9,018,790 B2
(45) Date of Patent: Apr. 28, 2015

(54) WIND POWER GENERATION EQUIPMENT

(75) Inventor: Zhubin Sun, Zhejiang (CN)

(73) Assignee: Zhejiang Linix Motor Co., Ltd., Dongyang, Zhejiang (CN)

( * ) Notice: Subject to any disclaimer, the term of this patent is extended or adjusted under 35 U.S.C. 154(b) by 154 days.

(21) Appl. No.: 13/879,390

(22) PCT Filed: May 18, 2012

(86) PCT No.: PCT/CN2012/075689
§ 371 (c)(1),
(2), (4) Date: Apr. 12, 2013

(87) PCT Pub. No.: WO2013/120327
PCT Pub. Date: Aug. 22, 2013

(65) Prior Publication Data
US 2013/0307275 A1    Nov. 21, 2013

(51) Int. Cl.
*F03D 9/00* (2006.01)
*H02P 9/04* (2006.01)
*H02K 7/18* (2006.01)
*H02K 21/22* (2006.01)
*H02K 21/14* (2006.01)

(52) U.S. Cl.
CPC ............ *F03D 9/002* (2013.01); *H02K 2201/15* (2013.01); *F05B 2220/706* (2013.01); *H02K 7/183* (2013.01); *H02K 21/22* (2013.01); *Y02E 10/725* (2013.01); *Y02E 10/721* (2013.01); *H02K 21/14* (2013.01)

(58) Field of Classification Search
CPC ........... F03D 9/002; F03D 9/00; H02K 21/14; H02K 21/22; H02K 7/183; H02K 2201/15; Y02E 10/721; Y02E 10/725; F05B 2220/706
USPC .......................................... 290/55, 44, 43, 54
See application file for complete search history.

(56) References Cited

U.S. PATENT DOCUMENTS 1,125,783 A * 1/1915 Waters ............................ 290/44

* cited by examiner

*Primary Examiner* — Javaid Nasri
(74) *Attorney, Agent, or Firm* — Global IP Services; Tianhua Gu

(57) ABSTRACT

An annular hood, with a stator assembly mounted and fixed therein, is fixed on the support bar. The stator assembly comprises an annular stator mounting plate which is fixed with an inner stator ring and an outer stator ring distributed concentrically. An annular track is formed between the inner stator ring and the outer stator ring. A rotor assembly and the stator assembly are coaxially and pivotally connected on the support bar, and the rotor assembly is formed of a rotor holder and multiple rotors distributed uniformly on the periphery of the rotor holder at interval. The rotor holder is formed of an outer ring and an inner ring, multiple blade fixing members of a spoke structure are arranged between the outer ring and the inner ring of the holder, and blades are fixed on the blade fixing members. The rotors are protruded and fixed on the outer ring of the holder axially, and a steel magnet of the rotors is located in the annular track between the inner stator ring and the outer stator ring.

8 Claims, 7 Drawing Sheets

WIND POWER GENERATION EQUIPMENT

TECHNICAL FIELD OF THE INVENTION

The invention relates to wind power generation equipment, belonging to the technical field of wind power generation equipment manufacture.

BACKGROUND OF THE INVENTION

Wind resource is a kind of inexhaustible and incessant energy resource. The utilization of wind in power generation may reduce environmental pollution and save conventional energy resources such as coal and oil. The wind power generation technology is mature, with relatively low cost among renewable energy resources and broad prospect for development. The wind power generation technology may be applied flexibly. It can operate not only on-grid collaboratively but also off-grid independently, and it may also form complementary power generation systems with other energy technologies. However, torque is generally transmitted between blades and rotors of the existing wind generators by rotating shafts or gear mechanisms, a high wind speed of typically 3.5 m/s is often required to start up the existing wind power generators, and the application of the existing wind power generators is limited largely.

SUMMARY OF THE INVENTION

The purpose of the invention is to provide wind power generation equipment with a low start-up wind speed and small limitation in application, to solve the problems that a high wind speed of typically 3.5 m/s is often required to start up the existing wind power generators, and the application of the existing wind power generators is limited largely.

The technical purpose of the invention is mainly solved by the following technical solution. Wind power generation equipment is provided, comprising a support bar. An annular hood, with a stator assembly mounted and fixed therein, is fixed on the support bar. The stator assembly comprises an annular stator mounting plate which is fixed with an inner stator ring and an outer stator ring distributed concentrically. The inner stator ring is formed of multiple inner stators distributed uniformly at interval in the peripheral direction, and the outer stator ring is formed of multiple outer stators distributed uniformly in the peripheral direction. An annular track is formed between the inner stator ring and the outer stator ring. A rotor assembly and the stator assembly are coaxially and pivotally connected on the support bar, and the rotor assembly is formed of a rotor holder and multiple rotors distributed uniformly on the periphery of the rotor holder at interval. The rotor holder is formed of an outer ring and an inner ring, multiple blade fixing members of a spoke structure are arranged between the outer ring and the inner ring of the holder, and blades are fixed on the blade fixing members. The rotors are protruded and fixed on the outer ring of the holder axially, and a steel magnet of the rotors is located in the annular track between the inner stator ring and the outer stator ring. In the invention, the rotors are directly fixed on the outer ring of the holder, in this way, the steel magnet and the blades may rotate synchronously, thus the wind power generation equipment may be started by an extremely low wind speed, as low as 0.2 m/s, such wind power generation equipment has very broad application scope and may be applied to the families. In addition, in the invention, multiple inner stators form an inner stator ring and multiple outer stators form an outer stator ring, and an annular track is formed between the inner stator ring and the outer stator ring to allow the rotors to run, in this way, wind energy driving the blades to rotate may be fully transformed into electric energy, and the transformation efficiency is high.

Preferably, the blades are formed of multiple sections of blade units from the outer ring of the holder to the inner ring of the holder, and the width of the multiple sections of blade units increases gradually from the outer ring of the holder to the inner ring of the holder, thus ensuring each part of the rotor assembly in the radial direction from the outer ring of the holder to the inner ring of the holder to be stressed uniformly, to make the equipment run more stably.

Preferably, an included angle between a blade unit in the multiple blade units near the outer ring of the holder and the axis of the rotor holder is smaller than that between a blade unit near the inner ring of the holder and the axis of the rotor holder, and gradually increases from the outer ring of the holder to the inner ring of the holder, so that wind may be utilized repeatedly in the radial direction of the rotor assembly from the outside to the inside, to further lower the start-up wind speed of the wind power generator equipment.

Preferably, a rear end edge of the annular hood is provided with two tail fins distributed symmetrically on left and right sides, the tail fins extend backward and outward from the edge of the annular hood, and a cross section of the tail fins is an arc. Wherein the direction of the rotor assembly may be adjusted automatically by arrangement of the tail fins on the rear end of the annular hood, thereby making the rotor assembly always face the direction from where wind comes. Moreover, the tail fins extend backward and outward from the edge of the annular hood and the cross section of the tail fins is an arc, in this way, the direction of the rotor assembly may be adjusted by wind more easily under the action of the tail fins.

Preferably, a crossed support frame is fixed on an upper end of the support bar, and a rear end face of the annular stator mounting plate is fixed with the crossed support frame, so that the stator assembly may be stably mounted and fixed.

Preferably, a front end of the annular hood is formed into an annular frustum surface, and the outer ring of the rotor holder is located on the rear side of the annular frustum surface. As the front end of the annular hood is formed into the annular frustum surface, on one hand, the rotors may be protected against water, and on the other hand, wind may be gathered, so that wind may be gathered on the blades.

Preferably, both the inner stator and the outer stator comprise a flat box and a cover. The box and the cover are in sealed connection and form a sealed cavity provided with a coil frame and a coil winding wound on the coil frame therein. A first lug and a second lug are formed on the box and the cover, respectively, and form a mounting portion for mounting the inner stator or the outer stator and the stator mounting plate. A circuit board connected with the coil winding is arranged on one side of the mounting portion fitted with the stator mounting plate. Wherein the way that both the coil frame and the coil winding are arranged inside the sealed box and cover may protect the coil winding against water, and the box and the cover are sealed and fixed by ultrasonic welding. The circuit connection between the stators and the stator mounting plate may be achieved after the inner stator or the outer stator is fixed on the stator mounting plate, and the assembly is very convenient.

Preferably, a reinforced rib is arranged between the first lug and the box, to improve the reliability of connection between the mounting portion and the box and further to reinforce the reliable mounting of the stators on the mounting plate.

So, the invention has the characteristics of low start-up wind speed and small limitation in the applications.

DETAILED DESCRIPTION OF THE INVENTION

The technical solutions of the invention will be further described in detail below with reference to embodiments and drawings.

Embodiment 1

Figure 1:
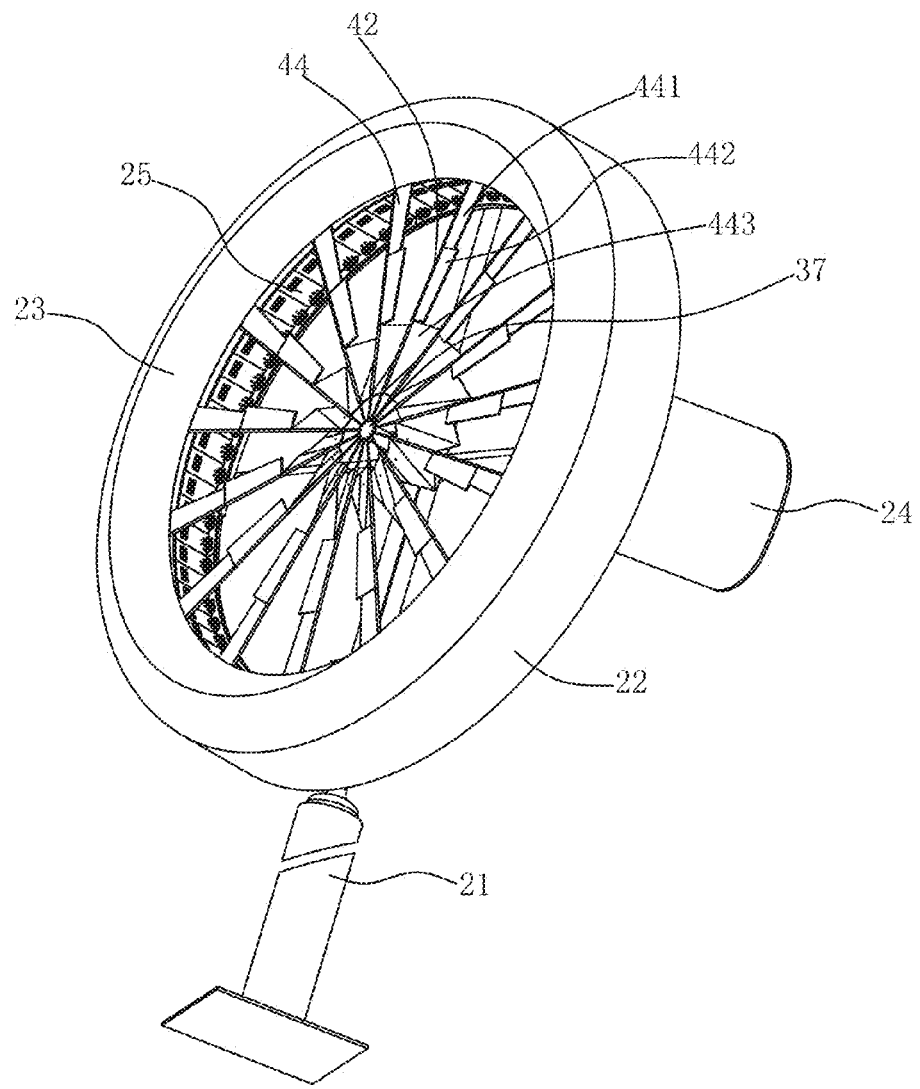
FIG. 1 is a three-dimensional structural diagram of the front side of the invention.
Figure 2:
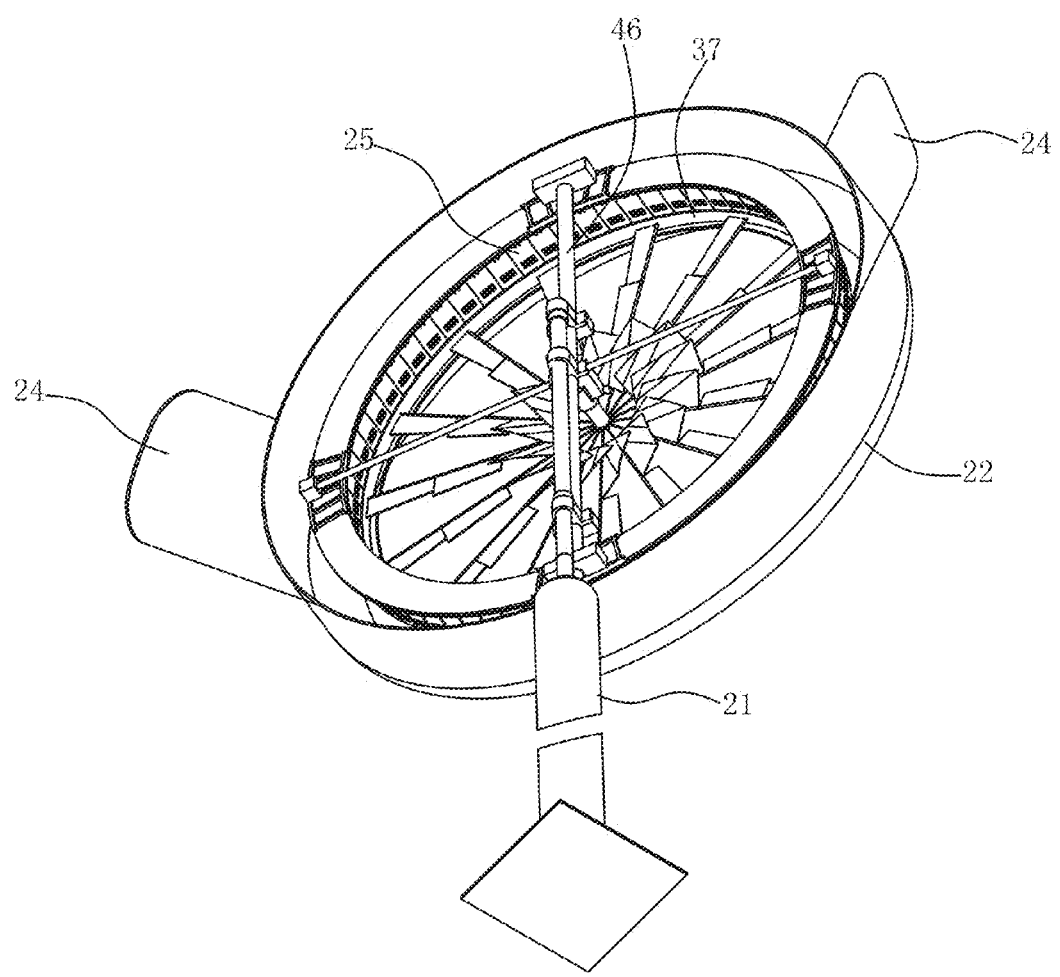
FIG. 2 is a three-dimensional structural diagram of the back side of the invention.
Figure 3:
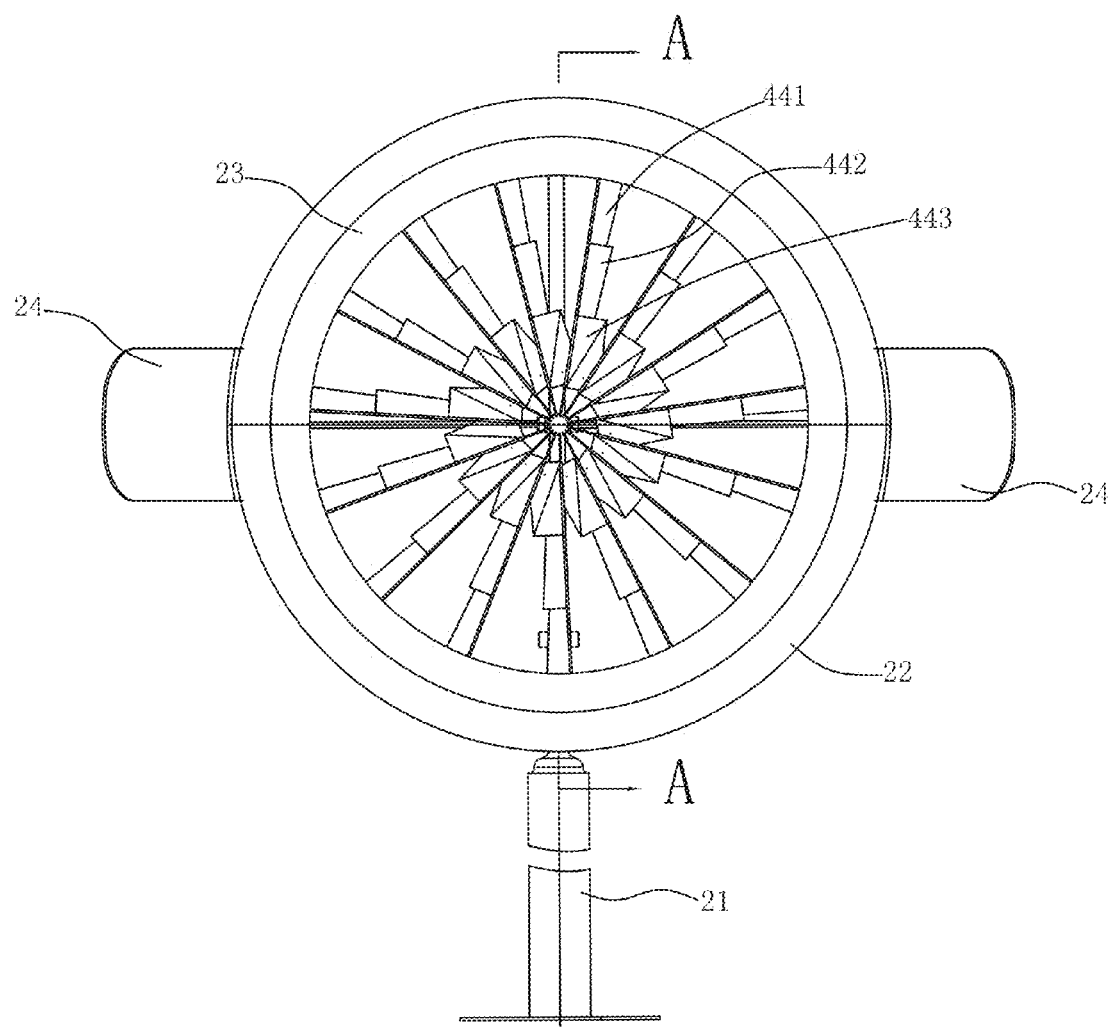
FIG. 3 is a front view of the invention.
Figure 4:
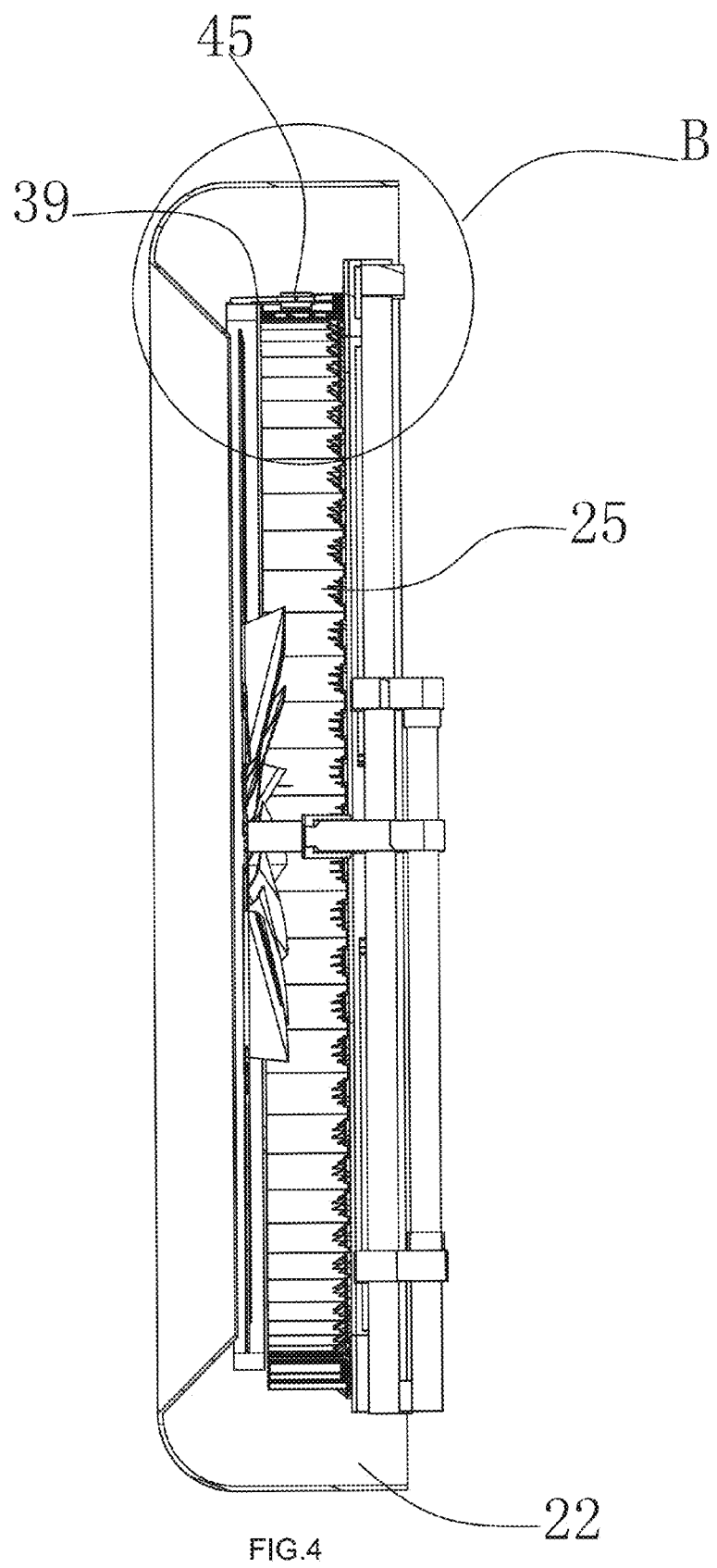
FIG. 4 is an A-A view of the FIG. 3.
Figure 5:
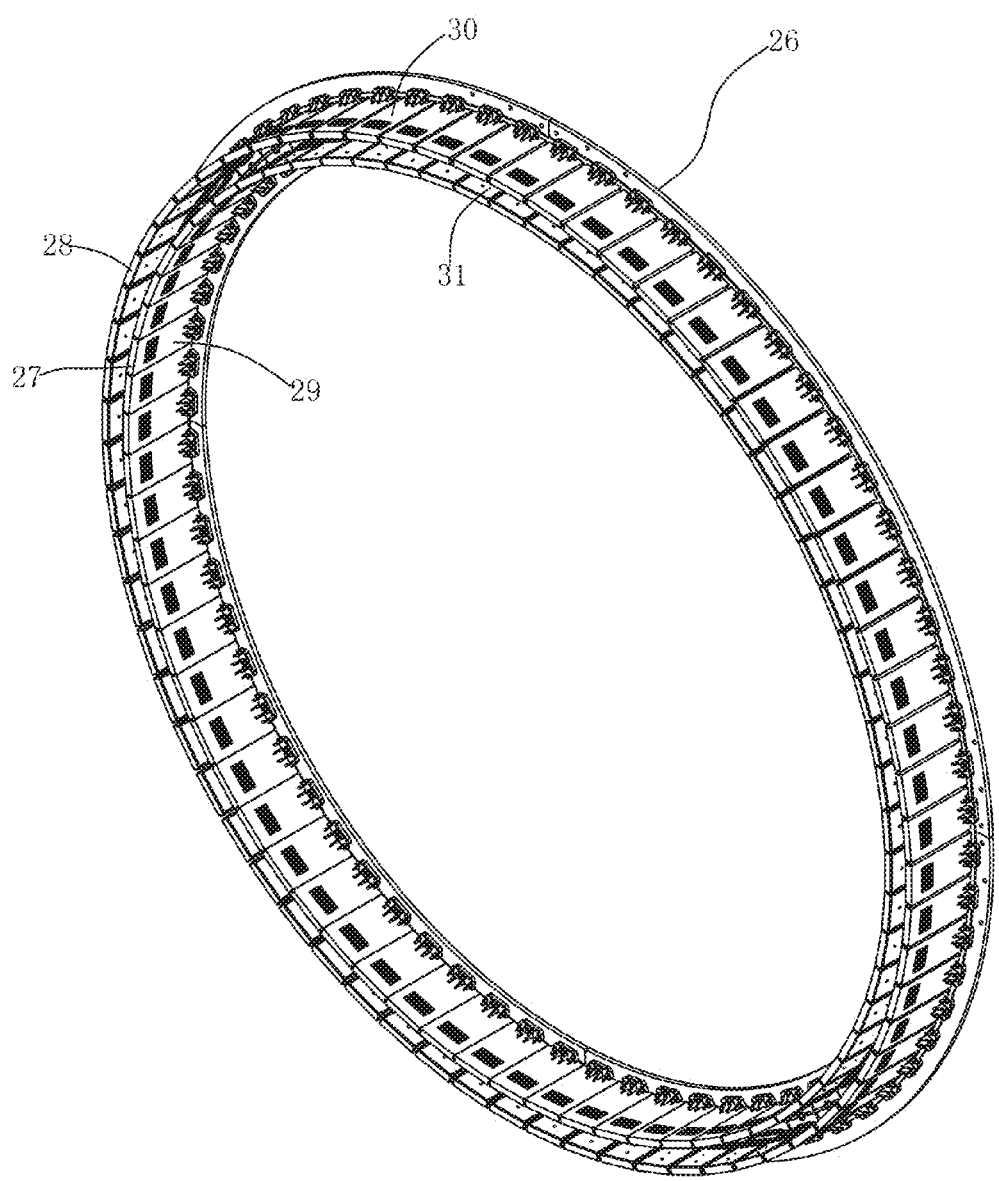
FIG. 5 is a three-dimensional structural diagram of a stator assembly of the invention.
Figure 6:
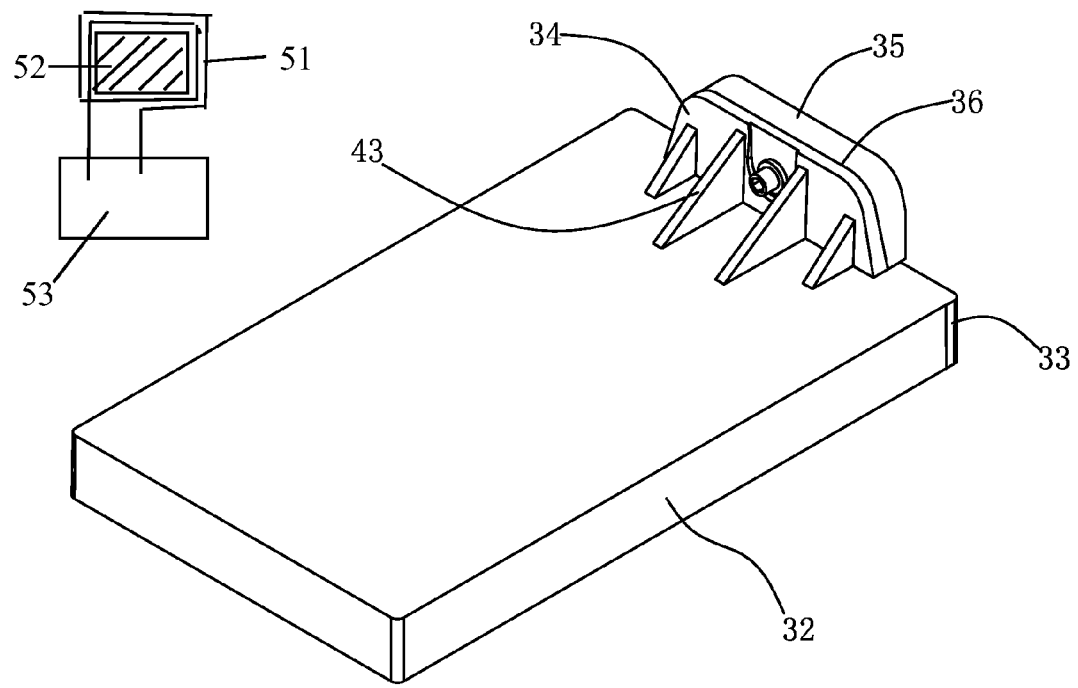
FIG. 6 is a structural diagram of an inner stator and an outer stator of the invention.

As shown in FIGS. 1, 2, 3 and 4, an annular hood 22 is fixed on a support bar 21. A front end of the annular hood 22 is formed into an annular frustum surface 23, and a rear end edge of the annular hood 22 is provided with two tail fins 24 distributed symmetrically on left and right sides. The tail fins 24 extend backward and outward from the edge of the annular hood 22, and the cross section of the tail fins 24 is an arc. A stator assembly 25 is mounted and fixed in the annular hood 22. As shown in FIG. 5, the stator assembly 25 comprises an annular stator mounting plate 26. A crossed support frame 46 is fixed on an upper end of the support bar 21, and a rear end face of the annular stator mounting plate 26 is fixed with the crossed support frame. The annular stator mounting plate 26 is fixed with an inner stator ring 27 and an outer stator ring 28 distributed concentrically. The inner stator ring 27 is formed of sixty eight inner stators 29 distributed uniformly at interval in the peripheral direction and the outer stator ring 28 is formed of sixty eight outer stators 30 distributed uniformly in the peripheral direction, and an annular track 31 is formed between the inner stator ring 27 and the outer stator ring 28. As shown in FIG. 6, both the inner stator and the outer stator comprise a flat box 32 and a cover 33 which are in sealed connection by ultrasonic welding, and a sealed cavity formed by the box 32 and the cover 33 is provided with a coil frame 52 and a coil winding 51 wound on the coil frame therein. A first lug 34 and a second lug 35 are formed on the box and the cover, respectively, and a reinforced rib 43 is arranged between the first lug 34 and the box 32. The first lug 34 and the second lug 35 form a mounting portion 36 for mounting the inner stator or the outer stator and the stator mounting plate. A circuit board 53 connected with the coil winding is arranged on one side of the mounting portion fitted with the stator mounting plate.

Figure 7:
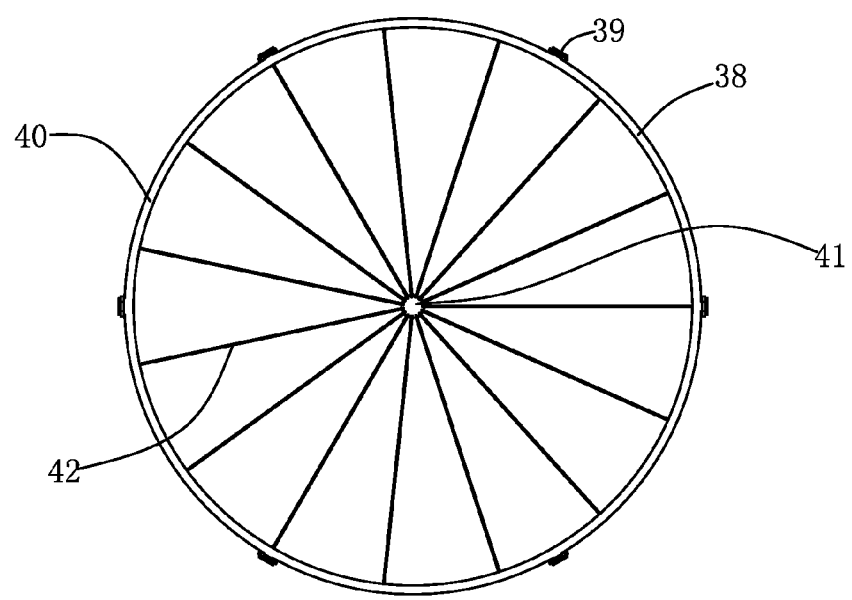
FIG. 7 is a plan view structural diagram of a rotor assembly of the invention.
Figure 8:
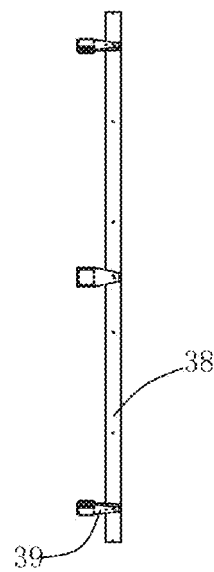
FIG. 8 is a side view structural diagram of the rotor assembly of the invention.
Figure 9:
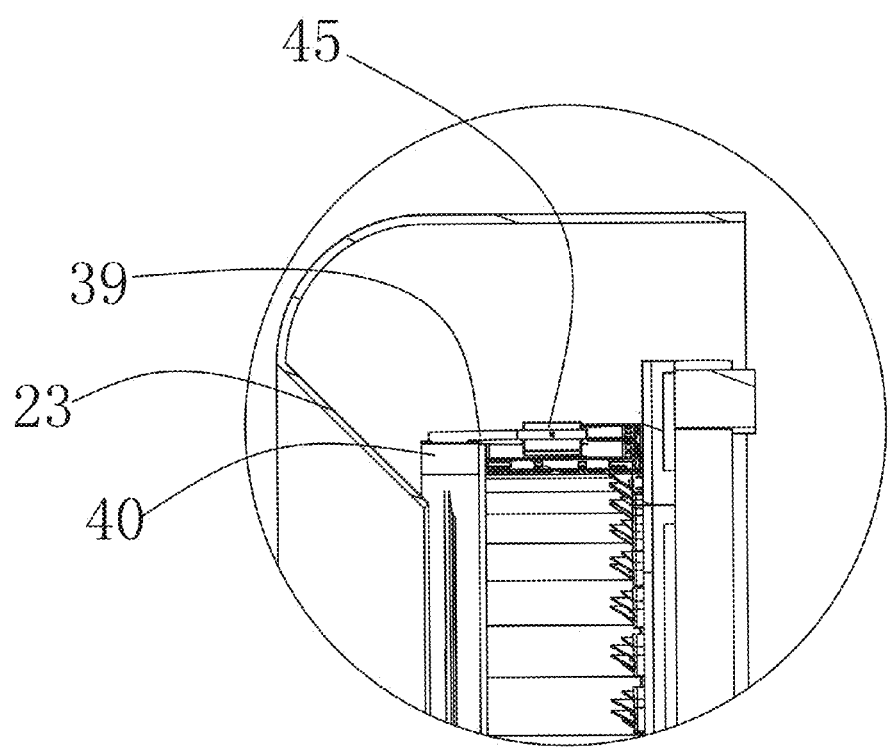
FIG. 9 is an enlarged diagram of part B of FIG. 5.

As shown in FIGS. 1, 2, 3 and 4, a rotor assembly 37 and the stator assembly 25 are coaxially and pivotally connected on the support bar 1. As shown in FIGS. 7 and 8, the rotor assembly is formed of a rotor holder 38 and six rotors 39 which are distributed uniformly at interval on the periphery of the rotor holder. The rotor holder 38 is formed of an outer ring 40 and an inner ring 41, and fifteen blade fixing members 42 of a spoke structure are arranged between the outer ring 40 and the inner ring 41. As shown in FIGS. 1, 2, 3 and 4, the rotors 39 are protruded and fixed on the outer ring axially, and a steel magnet 45 of the rotors is located in the annular track between the inner stator ring and the outer stator ring (referring to FIG. 9). Blades 44 are fixed on the blade fixing members 42, and each blade is formed of three sections of blade units 441, 442 and 443 from the outer ring of the holder to the inner ring of the holder. The width of the three sections of blade units 441, 442 and 443 increases gradually from the outer ring of the holder to the inner ring of the holder, that is to say, the width of the blade unit 442 is greater than that of the blade unit 441, and the width of the blade unit 443 is greater than that of the blade unit 443. The outer ring 40 of the rotor holder is located on the rear side of the annular frustum surface 23. An included angle between the blade unit 441 in the multiple blade units 441, 442 and 443 near the outer ring of the holder and the axis of the rotor holder is smaller than that between the blade unit 443 near the inner ring of the holder and the axis of the rotor holder, and gradually increases from the outer ring of the holder to the inner ring of the holder.

What is claimed is:

1. Wind power generation equipment, comprising a support bar, wherein an annular hood, with a stator assembly mounted and fixed therein, is fixed on the support bar; the stator assembly comprises an annular stator mounting plate which is fixed with an inner stator ring and an outer stator ring distributed concentrically; the inner stator ring is formed of multiple inner stators distributed uniformly at interval in the peripheral direction, and the outer stator ring is formed of multiple outer stators distributed uniformly in the peripheral direction; an annular track is formed between the inner stator ring and the outer stator ring; a rotor assembly and the stator assembly are coaxially and pivotally connected on the support bar, and the rotor assembly is formed of a rotor holder and multiple rotors distributed uniformly on the periphery of the rotor holder at interval; the rotor holder is formed of an outer ring and an inner ring, multiple blade fixing members of a spoke structure are arranged between the outer ring and the inner ring of the holder, and blades are fixed on the blade fixing members; and the rotors are protruded and fixed on the outer ring of the holder axially, and a steel magnet of the rotors is located in the annular track between the inner stator ring and the outer stator ring.

2. The Wind power generation equipment according to claim 1, wherein the blades are formed of multiple sections of blade units from the outer ring of the holder to the inner ring of the holder, and a width of the multiple sections of blade units increases gradually from the outer ring of the holder to the inner ring of the holder.

3. The Wind power generation equipment according to claim 2, wherein an included angle between a blade unit in the multiple blade units near the outer ring of the holder and the axis of the rotor holder is smaller than that between a blade unit near the inner ring of the holder and the axis of the rotor holder, and gradually increases from the outer ring of the holder to the inner ring of the holder.

4. The Wind power generation equipment according to claim 1, wherein a rear end edge of the annular hood is provided with two tail fins distributed symmetrically on left and right sides, the tail fins extend backward and outward from an edge of the annular hood, and a cross section of the tail fins is an arc.

5. The Wind power generation equipment according to claim 1, wherein a crossed support frame is fixed on an upper end of the support bar, and a rear end face of the annular stator mounting plate is fixed with the crossed support frame.

6. The Wind power generation equipment according to claim 1, wherein a front end of the annular hood is formed into an annular frustum surface, and the outer ring of the rotor holder is located on the rear side of the annular frustum surface.

7. The Wind power generation equipment according to claim 1, wherein both the inner stator and the outer stator comprise a flat box and a cover; the box and the cover are in sealed connection and form a sealed cavity provided with a coil frame and a coil winding wound on the coil frame therein; a first lug and a second lug are formed on the box and the cover, respectively, and form a mounting portion for mounting the inner stator or the outer stator and the stator mounting plate; and a circuit board connected with the coil winding is arranged on one side of the mounting portion fitted with the stator mounting plate.

8. The Wind power generation equipment according to claim 7, wherein a reinforced rib is arranged between the first lug and the box.

* * * * *